Sept. 8, 1964 D. D. SLITER ET AL 3,148,355

STORAGE DEVICE UTILIZING COLOR FILM AND MOVABLE FILTERS

Filed Dec. 26, 1961 2 Sheets-Sheet 1

INVENTORS.
DONALD D. SLITER
RAYMOND M. CHADLY

BY Walter J. Madden Jr.

ATTORNEY

STORAGE DEVICE UTILIZING COLOR FILM AND MOVABLE FILTERS

Filed Dec. 26, 1961 2 Sheets-Sheet 2

United States Patent Office 3,148,355

Patented Sept. 8, 1964

3,148,355

STORAGE DEVICE UTILIZING COLOR FILM AND MOVABLE FILTERS

Donald D. Sliter, San Jose, and Raymond M. Chadly, Morgan Hill, Calif., assignors to International Business Machines Corporation, New York, N.Y., a corporation of New York Filed Dec. 26, 1961, Ser. No. 162,095

1 Claim. (Cl. 340—173)

This invention relates in general to data storage apparatus and relates more particularly to such storage apparatus utilizing photographic color film as a storage medium.

There is considerable interest in data processing in developing very high capacity character storage devices. Such large scale character storage devices are useful in numerous applications, such as storing table look-up items and for program storage and the like in connection with large computers. It has heretofore been proposed to utilize conventional black and white photographic film for data storage by varying the intensity of exposure of different areas of the film as a function of the data to be stored and subsequently detecting the density of exposure of the different areas to determine the nature of the stored data. It has also been proposed to utilize color coding in different colors on a record member to represent different bits of data. However, none of the prior art devices to our knowledge utilize color film in the manner contemplated in our invention to store binary data. In accordance with the present invention, we utilize the properties of color film to store a large amount of information in an extremely small area of film, utilizing the third dimension of depth obtainable with color film. Each incremental area of the color film emulsion is controllably exposed to one or more of a selected group of colors in controlled intensities so as to store in each of these incremental areas of the color film emulsion a unique representation of one or more colors in controlled intensities. Assuming that three colors are utilized and that four intensity or density levels plus zero may be controllably imparted to each of these colors in the film emulsion, there results a $5^3$ or $2^7$ binary equivalent storage in each resolution area of the color film. This means, for example, that each resolution area of the film is capable of storing a single character represented in a 7-bit binary code.

To read out the data stored in the different resolution areas of the color film, light is projected through the film and the transmitted light is broken down into its color components. The intensity level of each of these color components in the transmitted light is determined, and the combination of intensity levels for the different colors is decoded to determine the identity of the stored character.

The foregoing and other objects, features and advantages of the invention will be apparent from the following more particular description of a preferred embodiment of the invention, as illustrated in the accompanying drawings.

Figure 1:
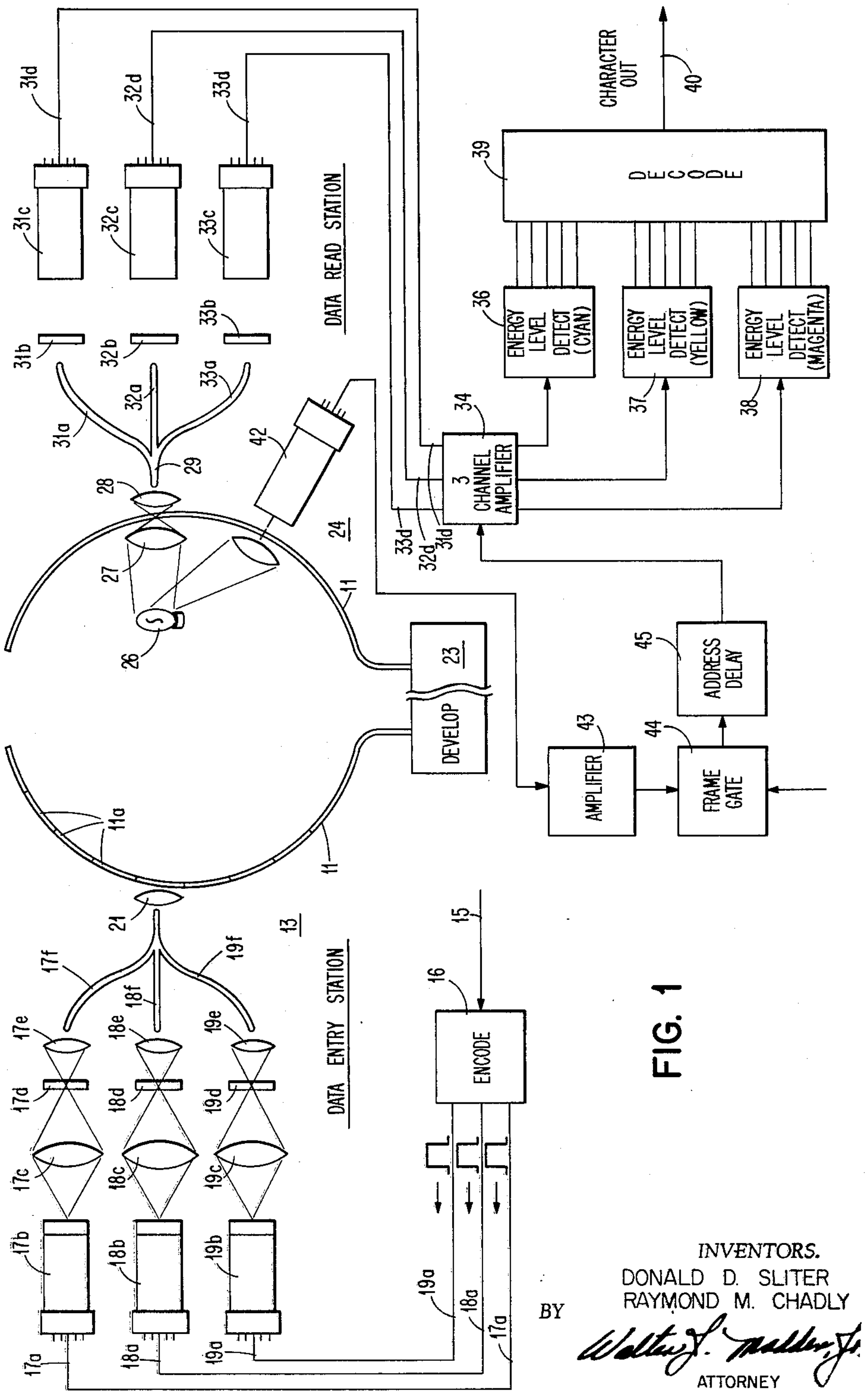
FIG. 1 illustrates one embodiment of the present invention showing a data input and a data output station.

Referring to FIG. 1, there is shown diagrammatically one embodiment illustrating the principles of the present invention. Reference numeral 11 designates a color film which forms the storage medium of the present invention. In the embodiment illustrated, color film 11 is in the form of an elongated strip and may be divided into a plurality of separate frames 11*a* in the manner similar to conventional 35 mm. color film. Color film 11 may be of any suitable type and preferably is of the well known type having a light sensitive emulsion deposited on a transparent backing sheet. As is well known in the art, the color emulsion is formed of layers of color-light sensitive compounds.

The data is entered in film 11 at a data entry station 13. In the embodiment illustrated in FIG. 1, it is assumed that the data is to be stored on film 11 in one of four intensity levels (plus zero) in each of three colors. The complementary colors of magenta, cyan and yellow are preferably used in the color storage color recognition techniques of the present invention. The color rejection technique is well known in the color photography art and will be described in further detail in connection with the description of the color recognition apparatus of the present invention. Briefly, in the color rejection technique for color recognition, the data to be stored is converted into different intensity levels of each of the three complementary colors—magenta, cyan and yellow, and recognition of the intensity levels of these colors is achieved by passing the light representing the stored data through filters of each of the primary additive colors—red, blue and green. In accordance with well known color rejection techniques, a blue filter will absorb substantially all yellow light, while it will pass substantially all of the magenta and cyan light. Similarly, a green filter will absorb substantially all of the magenta light, while passing the cyan and the yellow light components. Further, a red filter will absorb cyan light, while passing the yellow and magenta components. Thus, the color recognition is based on a comparison of the intensity of a light beam before and after passage through filters of the primary additive color, the difference in intensity of this light beam before and after passage through a given filter being a measure of the intensity of light in the complementary color which that filter rejects.

Under these conditions, the input data from a conductor 15 is supplied to an encoding device 16 in which the input data characters are converted into signals to each of three channels representing the three complementary colors. These channels are indicated by conductors 17*a*, 18*a*, 19*a*, respectively. The output signals from coding device 16 to each of the different channels are utilized to control the level of exposure of the film to the color associated with that channel. Assuming that channel 17*a* corresponds to the magenta color channel, the signal on conductor 17*a* is utilized to control the intensity of the magenta light supplied to film 11 as a function of the input data supplied through encoder 16. Similarly, the signal on conductor 18*a* controls the intensity of exposure to blue cyan light, and the signal on conductor 19*a* controls the intensity of exposure to yellow light. Such control may be achieved by any suitable means such as through glow modulator tubes 17*b*, 18*b*, 19*b* which emit light outputs whose intensities are functions of the associated input pulses from conductor 17*a*, 18*a*, 19*a*.

The light emitted from modulator tube 17*b* is transmitted through a lens 17*c* to magenta filter 17*d*. The magenta light of controlled intensity passed by magenta filter 17*d* passes through a second lens 17*e* and then enters one end of a light pipe member 17*f*. Similarly, the light output from modulator tube 18*b* is supplied through a lens 18*c* to a blue cyan filter 18*d* and then through a lens 18*e* to one end of a light pipe member 18*f*. The modulated light output from modulator tube 19*b* is supplied through a lens 19*c* to a yellow filter 19*d*, and the modulated yellow light passing through filter 19*d* is supplied through a lens 19*e* to a light pipe member 19*f*. Light pipe members 17*f*, 18*f*, 19*f* are joined at their opposite ends to mix the light transmitted through the individual members to essentially a single point of light representing the combination of the intensity modulated light signals in the three complementary colors. The resultant composite light beam emitted from the merged ends of the light pipes is passed through a lens 21 and focused on an incremental area of the portion of film 11 immediately adjacent the data entry station. Preferably the size of the resultant light beam focused on the color film is as small as practical in order to maximize the storage capacity of the film while still maintaining resolution of the resultant stored character. An incremental resolution area of film 11 thus receives a coded exposure representing a unique combination of intensities of each of the three complementary colors.

The entry of additional data into storage continues in the above manner by successively exposing different incremental areas of color film 11 to the modulated light beam to store data in the different areas of the film. After each exposure, the film may be moved laterally to successively expose all incremental resolution areas on one line of film. Then the film may be advanced to the next line to accomplish the storage of data in that line. After completion of the desired storage of data on the film, film 11 is developed by apparatus indicated diagrammatically at 23.

To read out the data stored in the different incremental resolution areas of film 11, the film is moved past a reading station indicated at 24. Preferably the film is advanced past the reading station in a manner similar to that utilized in transporting the film past the data entry station 13. The incremental area of film 11 to be read is positioned adjacent a suitable light source such as a bulb 26 which projects a beam of light through a lens 27 and thence through the incremental area of film 11 from which the data is to be read.

As indicated above, the color recognition technique utilized in the present invention is a subtractive or color rejection method. In accordance with this method, the light beam projected through film 11 at the data read station is passed separately through filters corresponding to the primary additive colors—red, blue and green. The intensity of the light which passes through each filter is compared with the light intensity entering the filter, and the difference between these quantities is a measure of the intensity of the complementary color which is rejected by that filter. Thus, the difference between the amount of light entering the red filter and the amount of light leaving this filter is a measure of the amount of cyan light in the beam, since the red filter rejects cyan light. Similarly, the difference between the amount of light entering the green filter and leaving the green filter is a measure of the amount of magenta present in the light beam, and the difference between the amount of light entering the blue filter and leaving the blue filter is a measure of the amount of yellow present in the light beam.

The following table illustrates the principles of the color recognition by color rejection or absorption. The table indicates the results obtained from projecting a beam of white light separately through filters corresponding to each of the primary additive colors—red, blue and green—and measuring the composition of the resultant light transmitted through these filters to three photomultipliers. The outputs of the photomultipliers under these conditions had intensity levels as indicated in the first column. A cyan filter was then inserted between the light source and the photomultipliers, and the photomultiplier outputs under these conditions are shown in the second column. The third column indicates the photomultiplier outputs when the cyan filter was replaced by a yellow filter, and the fourth column represents the photomultiplier outputs when the yellow filter was replaced by a magenta filter.

| | White Light Reading, Volts | Cyan, Volts | Yellow, Volts | Magenta, Volts |
|---|---|---|---|---|
| Green | 36.5 | 31.75 | 35.0 | 1.75 |
| Blue | 38.0 | 35.5 | 5.0 | 36.25 |
| Red | 38.0 | 1.75 | 37.5 | 36.25 |

As shown in the table, the green filter rejects substantially all the magenta light, while passing substantially all of the cyan and yellow components. Similarly, the blue filter rejects substantially all of the yellow light while passing the cyan and magenta, and the red filter rejects substantially all of the cyan light while passing the yellow and magenta components. The above table indicates the principles of color recognition by color rejection of pure complementary colors, but it will be understood that these principles apply equally well to combinations of the different complementary colors.

Thus, the color rejection technique is effective to recognize a given complementary color by detecting the amount of this complementary color which is rejected by one of the filters of the primary additive colors. As indicated in the table, the operating range of the above system is from five volts to 31.75 volts. This range allows four levels of intensity to be established in a 26.75 volt range, with provision for utilizing only the middle portion of each of the four levels so as to minimize the possibility of overlap.

The light transmitted through the incremental area of film 11 from source 26 is focused by a second lens 28 and then enters the end of a light pipe member 29 which divides into three branches 31*a*, 32*a*, 33*a* corresponding to the different color channels. The light emitted from the end of light pipe 31*a* passes through a red filter 31*b* and enters a photomultiplier tube 31*c* which produces an output signal over a channel output conductor 31*d*. This output signal is a measure of the amount of blue cyan light in the light received by the end of light pipe 29 from scanning of the incremental resolution area of film 11. Similarly, the light emitted from light pipe 32*a* passes through a blue filter 32*b* and enters the aperture of a photomultiplier tube 32*c* which produces an output signal on a conductor 32*d* which is a measure of the amount of yellow light in the projected light. The light emitted from the end of light pipe 33*a* is projected through a green filter 33*b* and falls on a photomultiplier 33*c* which produces on an output conductor 33*d* a signal which is a function of the amount of magenta light in the scanned area of the storage film.

The output signals on conductors 31*d*, 32*d*, 33*d* are preferably first amplified by an amplifier 34 and then supplied to separate energy level detection circuits 36, 37, 38 which measure the amplitude levels of each of the three signals to produce a measure of the intensity level of each of the three different colors in the transmitted light. In the embodiment of FIG. 1 it is assumed that four intensity levels (plus zero) are utilized, and hence each of energy level detectors 36, 37, 38 is provided with five output lines corresponding to these five intensity levels. It will be understood that by suitably calibrating energy level detectors 36, 37, 38, the effect of a comparison between the intensity level of the light beam before its passage through the primary filter and its intensity after its passage through this filter can be achieved.

The outputs from energy level detectors 36, 37, 38 are supplied as inputs to a decoding network 39 which produces an output on a conductor 40 indicating the identity of the character represented by the coded intensity level input signals. As is well known in the art, decoding network 39 may be a diode matrix or other similar circuit which receives the inputs from the different conductors and produces an output to identify the stored character.

Figures 2, 3:
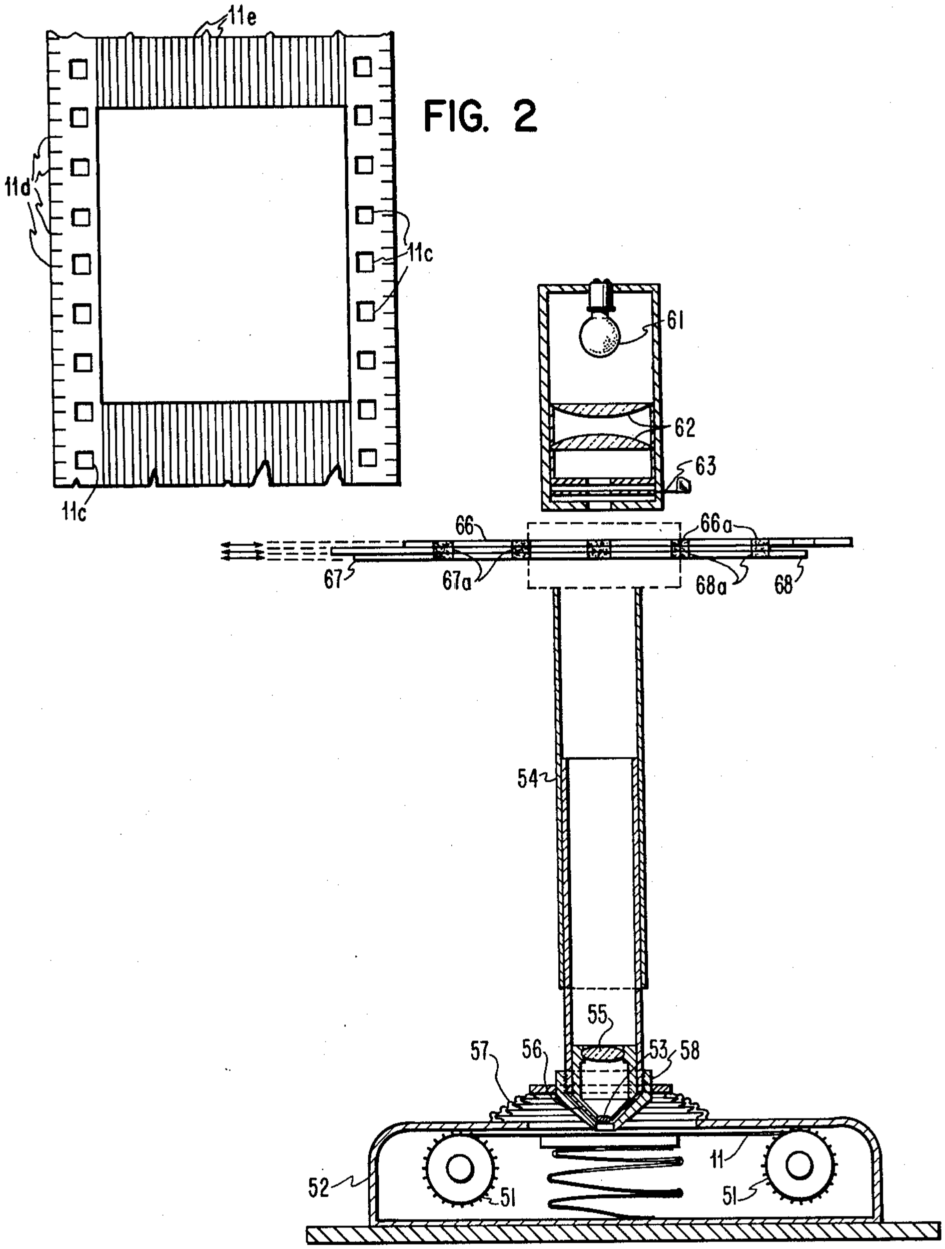
FIG. 2 is a view of portion of a color film storage member illustrating the use of registration marks to locate different storage areas on the member.
FIG. 3 illustrates alternative data input apparatus for achieving high storage density on a color film member.

To obtain access to a character stored in the color film in accordance with the present invention, it is necessary to be able to position the color film at any one of a number of identifiable positions. FIG. 2 illustrates a portion of a length of color film 11 in which such identification is facilitated. As shown in FIG. 2, the portion of film 11 is similar to a conventional 35 mm. film with sprocket holes 11*c* provided along the edges of the film for engaging sprockets which advance the film. To aid in positioning the film in the direction of movement represented by sprocket holes 11*c*, a plurality of marks or reference lines 11*d* may be provided on the film outside the sprocket holes. These marks 11*d* may be optically sensed to control the positioning of the film. Marks 11*d* may represent any convenient distribution or division of stored characters on the film member. For example, the distance between each of marks 11*d* may correspond to the area of film required to store a given number of characters, such as 100 characters.

In one method of positioning control, marks 11*d* are sensed as film 11 is advanced and these sensed marks are counted and compared with a count representing the address of the storage area to be located. For this operation, a photomultiplier tube 42 FIG. 1 may be provided to sense marks 11*d*. The output from tube 42 is supplied through an amplifier 43 to a frame gate circuit 44 which compares the count of sensed marks 11*d* with a count representing the location of the data to be read. When these counts are equal, gate 44 produces an output for gating the reading of the stored data at the desired location. Since tube 42 is reading address marks 11*d* ahead of the data read station 24, it is necessary to delay the gating signal from gate 44 in a delay 45 by an amount corresponding to the time required for film 11 to move from the address read station to the data read station. Delay 45 thus produces an output signal at the proper time to gate amplifier 34 for reading the stored data.

Where the film is to be moved laterally to permit read-in and read-out of characters across the strip, a plurality of lines 11*e* may be provided in the frame separation area as shown in FIG. 2. The spacing of marks 11*e* would correspond to the spacing between centers of adjacent elemental resolution areas of the color film and would represent the distance between adjacent characters in storage. By photo-optically sensing marks 11*e* and counting these marks, any desired lateral position on film 11 may be reached, in a manner similar to that discussed above for the longitudinal positioning.

FIG. 3 illustrates an alternative embodiment of apparatus for storing data in accordance with the present invention. The apparatus shown in FIG. 3 is particularly useful where it is desired to store an extremely large number of characters in a small area, thus requiring a resolution on the read-in apparatus which may exceed that obtainable with the light pipes of FIG. 1. In FIG. 3, film 11 is mounted on reels 51 in a camera enclosure 52. The camera enclosure is provided with an aperture 53 through which light may be projected to expose a selected incremental area of the film. This aperture 53 is at the end of a light tube having adjustable walls 54. Light is projected through tube 54, a magnifying lens 55 and a focusing lens 56 to sharply focus the projected light on a very small area of film 11 within the camera. The end of tube 54 is secured to the camera enclosure 52 by a bellows 57 which permit rotation of a focusing ring 58 while preventing entry of light into the camera enclosure.

The light projected down tube 54 is supplied from a source 61 such as an incandescent bulb. This light is projected through a condenser lens 62 and through a shutter mechanism 63 to the openings or windows in a plurality of code setting filter members 66, 67, 68. Each of the filter elements 66, 67, 68 is provided with a plurality of windows 66*a*, 67*a*, 68*a* therein, the density of each of the windows within a given filter element being different from the density of the other windows. Each of filter members 66, 67, 68 corresponds to one of the complementary colors. The windows in filter 66 correspond to different intensities of magenta, while the windows in filter element 67 correspond to different intensities of blue cyan and the windows in filter element 68 represent different intensities of yellow.

Each of the filter elements is movable in a direction normal to the axis of tube 54, as indicated by the arrows, to position any one of the windows in each of the filter elements in the path of the light projected from source 61 through shutter 63. Thus, by moving filter element 66, any shade of magenta within the range encompassed by window 66*a* may be placed in the path of the light from source 61. Similarly, by suitably positioning filter element 67, any sade of blue cyan within the range obtainable with windows 67*a* may be interposed in the path of the light from source 61, and by suitably positioning filter element 68, any shade of yellow within the range obtainable with windows 68*a* may be interposed in the light path. Thus, the light leaving the filter element array will have any intensity in each of the three complementary colors which is a function of the different filter element positions.

To store a given character, each of the filter elements 66, 67, 68 is moved so as to position the desired one of the associated filter windows in the center of the axis of tube 54. This positioning, it will be understood, may be controlled by encoding means which converts the data to be stored into corresponding positions of each of the three filter elements. With the filter elements positioned in the desired locations, shutter 63 is momentarily opened to permit light from source 61 and condenser lens 62 to pass through the aligned openings of the filter elements and thence through lenses 55, 56 to film 11. The resultant light beam leaving the filter array is a composite beam representing the encoding of the input data in terms of a discrete color hue. The color film thus receives an exposure corresponding to the intensity of the different colors encoded. The exposure of the film in this incremental area thus represents the storage of the character represented by the positions of the different filter elements 66, 67, 68.

While the invention has been particularly shown and described with reference to preferred embodiments thereof, it will be understood by those skilled in the art that the foregoing and other changes in the form and details may be made therein without departing from the spirit and scope of the invention.

What is claimed is:

Apparatus for storing digital data in color film comprising:
- a source of light,
- a plurality of movable light filter elements corresponding to the complementary colors disposed adjacent said source,
- each of said filter elements having a plurality of windows therein representing different intensity levels of the associated complementary color,
- means for moving said filter elements to align selected ones of said windows in the path of said light from said source in accordance with the digital data to be stored to produce a resultant light beam whose color composition is a function of the sum of the intensity levels represented by the selected ones of said windows, and
- means for projecting said resultant beam onto said film to produce exposure of an incremental area of said film.

References Cited in the file of this patent

UNITED STATES PATENTS

| | | |
|---|---|---|
| 2,951,736 | Black | Sept. 6, 1960 |
| 2,991,446 | Loper | July 4, 1961 |
| 3,043,910 | Hicks | July 10, 1962 |